(12) United States Patent
Swales et al.

(10) Patent No.: US 8,196,687 B2
(45) Date of Patent: Jun. 12, 2012

(54) LOW CONTENT EXTENDED-RANGE ELECTRIC VEHICLE POWERTRAIN

(75) Inventors: Shawn H. Swales, Canton, MI (US); Joel M. Maguire, Northville, MI (US); Michael G. Reynolds, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 12/796,148

(22) Filed: Jun. 8, 2010

(65) Prior Publication Data

US 2011/0297466 A1 Dec. 8, 2011

(51) Int. Cl.
*B60K 6/46* (2007.10)

(52) U.S. Cl. .............. 180/65.245; 180/65.265

(58) Field of Classification Search ..... 180/65.21–65.29
See application file for complete search history.

(56) References Cited

U.S. PATENT DOCUMENTS

| | | | |
|---|---|---|---|
| 5,788,006 A * | 8/1998 | Yamaguchi | 180/65.235 |
| 6,048,288 A * | 4/2000 | Tsujii et al. | 477/5 |
| 6,093,974 A * | 7/2000 | Tabata et al. | 290/40 R |
| 6,569,055 B2 * | 5/2003 | Urasawa et al. | 477/5 |
| 6,840,341 B2 * | 1/2005 | Fujikawa | 180/65.25 |
| 7,101,298 B2 * | 9/2006 | Sowul et al. | 475/5 |
| 7,117,071 B2 * | 10/2006 | Aoki et al. | 701/22 |
| 7,207,916 B2 * | 4/2007 | Rodeghiero et al. | 475/78 |
| 7,942,776 B2 * | 5/2011 | Conlon | 475/5 |
| 2003/0029653 A1 * | 2/2003 | Fujikawa | 180/65.2 |
| 2003/0062206 A1 * | 4/2003 | Fujikawa | 180/65.2 |
| 2004/0055799 A1 * | 3/2004 | Atarashi et al. | 180/65.2 |
| 2004/0124332 A1 * | 7/2004 | Takenaka et al. | 248/648 |
| 2004/0235613 A1 * | 11/2004 | Aoki et al. | 477/3 |
| 2004/0251064 A1 * | 12/2004 | Imai | 180/65.2 |
| 2005/0070397 A1 * | 3/2005 | Takasu et al. | 475/254 |
| 2005/0082096 A1 * | 4/2005 | Oono | 180/65.2 |
| 2009/0176610 A1 * | 7/2009 | Conlon | 475/5 |
| 2009/0236159 A1 * | 9/2009 | Shibata et al. | 180/65.235 |
| 2010/0125020 A1 * | 5/2010 | Ikegami et al. | 477/3 |
| 2010/0227722 A1 * | 9/2010 | Conlon | 475/5 |
| 2011/0009236 A1 * | 1/2011 | Yang et al. | 477/5 |

* cited by examiner

*Primary Examiner* — J. Allen Shriver, II
*Assistant Examiner* — Erez Gurari
(74) *Attorney, Agent, or Firm* — Quinn Law Group, PLLC

(57) ABSTRACT

An extended-range electric vehicle includes drive wheels, an engine having an output shaft, a planetary gear set having a node driven by the output shaft of the engine when the engine is on, and first and second electric machines. The first electric machine is connected to another node, and operates as a generator when the engine is on. A one-way clutch is connected to the remaining node. The second electric machine is connected to an output side of the one-way clutch, with a shaft connecting the drive wheels to the second electric machine. A controller provides a forward electric-only (EV) mode, a reverse EV mode, power-split mode(s), and series mode(s). The series mode(s) provide a direct mechanical path between the engine and drive wheels, with the one-way clutch overrunning in the forward EV mode. The one-way clutch may be activated passively or by a PRNDL device.

20 Claims, 1 Drawing Sheet

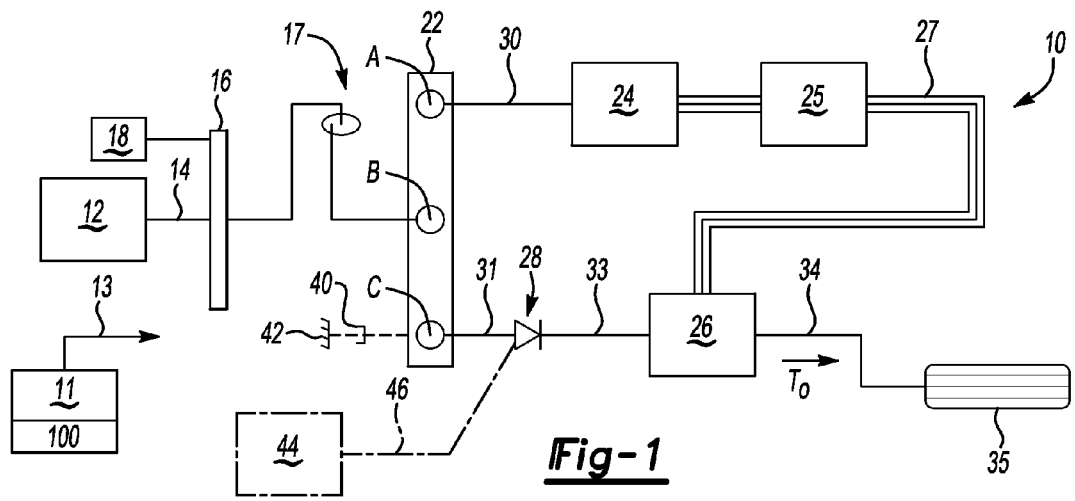
*Fig-1*
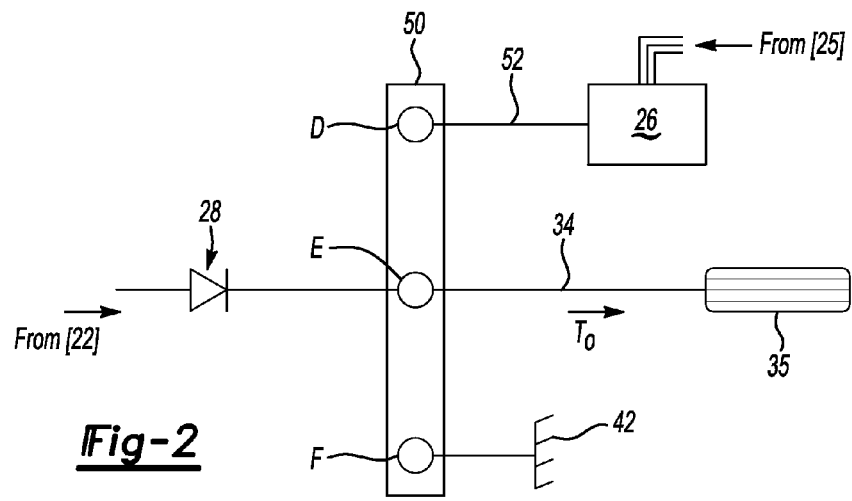
*Fig-2*
| 12 | MODE | 24 | 26 | 28 | 40 |
|---|---|---|---|---|---|
| ON | (1) Forward Series Split | ON | ON | X | O |
| ON | (2) Reverse Power Split | ON | ON | X | O |
| ON | (3) Forward Series | ON | ON | O | X |
| ON | (4) Reverse Series | ON | ON | O | X |
| OFF | (5) Forward EV | OFF | ON | O | O |
| OFF | (6) Reverse EV | OFF | ON | O/X | O |
*Fig-3*

LOW CONTENT EXTENDED-RANGE ELECTRIC VEHICLE POWERTRAIN

TECHNICAL FIELD

The present invention relates to extended-range electric vehicles.

BACKGROUND

An extended-range electric vehicle or EREV generally provides an extended electric-only (EV) series propulsion mode. In a series hybrid system, an electric machine attached to the engine functions as an electric motor to start the engine, and allows the electric machine, or a separate electric machine attached to the remainder of the drive train, to selectively act as a generator and thereby recover energy into a battery. A series design has an increased weight due to the electric machinery necessary to transform all engine power from mechanical-to-electrical and from electrical-to-mechanical, and from useful power lost in this double conversion. Additionally, series designs lack a direct mechanical path between the engine and the drive wheels.

An EREV has an onboard battery that can be recharged via plug-in battery power as well as via regenerative braking. The onboard gasoline engine turns an electric generator as needed to provide the extended EV operating range. Once the battery is largely depleted, the EREV design continues to extend the EV operating range of the vehicle as long as fuel remains in the tank. For commutes shorter than a threshold distance, e.g., approximately 40 miles in some embodiments, the engine is not required at all, and all propulsion is provided in EV mode.

SUMMARY

Accordingly, an extended-range electric vehicle (EREV) as disclosed herein has a direct mechanical path between its engine and drive wheels in all of its engine-on operating modes, unlike conventional series hybrid designs, thus improving fuel efficiency. The EREV includes at least one series mode, an electric-only (EV) mode, and a power-split mode, e.g., forward and reverse modes of each. The vehicle uses two electric machines. The first electric machine operates as a generator to energize another electric machine, with the first electric machine operating only when the engine is on or running. For example, a passively-rectified wound field device can be used as the first electric machine. The second electric machine is a motor/generator unit (MGU) that propels the vehicle during the EV mode(s). A one-way clutch, e.g., a controllable selectable one-way clutch (SOWC) such as a mechanical diode or other SOWC design having relatively low spin losses in one embodiment, overrides in the EV mode(s). An auxiliary starter motor allows the first electric machine to be used solely as a generator as set forth below.

In one embodiment, a single grounding clutch, e.g., an electrically-actuated band, is engaged during the series mode(s). A reverse series mode is enabled via the one-way clutch noted above, which in one possible embodiment may be a selectable one-way clutch (SOWC) and controlled via a PRNDL device to open or disengage in the reverse series mode. An output gearset can be used to reduce the size of the MGU.

In particular, a vehicle as provided herein has drive wheels, an engine with an engine output shaft, and a planetary gear set having first, second, and third nodes. The first node is connected to and driven by the engine output shaft only when the engine is on. The vehicle also includes first and second electric machines, a one-way clutch, an auxiliary starter motor, and a controller. The first electric machine is connected to the second node, and operates as a generator when the engine is on. The one-way clutch has an input side connected to the third node, and the second electric machine has a motor output shaft connected to the drive wheels.

The second electric machine operates alternatively as a motor and a generator, and is connected to an output side of the one-way clutch. The controller has an algorithm for controlling the engine, the electric machines, the one-way clutch, and the starter motor as needed to provide each of a forward electric-only (EV) mode, a reverse EV mode, at least one power-split mode, and at least one series mode. The series mode(s) provide a direct mechanical path between the engine and the drive wheels, with the one-way clutch overrunning in the forward EV mode when configured as a SOWC.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of an extended-range electric vehicle (EREV) in accordance with the present invention;

FIG. 2 is a schematic illustration of the EREV of FIG. 1 according to alternate embodiment; and FIG. 3 is a table describing the various operating modes of the EREV of FIGS. 1 and 2.

DESCRIPTION OF THE PREFERRED EMBODIMENTS

Referring to the drawings, wherein like reference numbers correspond to like or similar components throughout the several figures, an extended-range electric vehicle 10 is shown in FIG. 1 having a controller 11 and a shift control algorithm 100 or other logic adapted for controlling different powertrain operating modes of the vehicle via a set of control signals 13. The operating modes may include series forward and reverse modes, forward and reverse electric-only (EV) modes, and forward and reverse power split modes. As noted above, the series modes allow a direct mechanical path from an internal combustion engine 12 to a set of drive wheels 35 via a power transmission shaft 34, unlike conventional series hybrid designs lacking such a direct mechanical path.

Controller 11 may be configured as a digital computer having a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. Any algorithms resident in the controller 11 or accessible thereby, including the shift control algorithm 100, can be stored in ROM and automatically executed by the controller to establish the various operating modes.

As noted above, vehicle 10 includes the engine 12. Engine 12 in turn includes an output member 14, e.g., a drive shaft, which is directly connected to a flywheel 16 and damper assembly 17. A 12-volt auxiliary starter motor 18 can be selectively energized to rotate flywheel 16 for cranking and starting of the engine 12. Engine 12 connects to a gear set 22 via damper assembly 17, such that torque from the engine rotates members of the gear set 22. Gear set 22 may be configured as a planetary gear set having three nodes, which are respectively labeled A, B, and C in FIG. 1.

Optionally, a grounding clutch 40 may be positioned between node C and a stationary member 42 of the vehicle 10, e.g., a housing. As the name implies, grounding clutch 40 selectively grounds node C, and its inclusion in the vehicle 10 helps enable one or more series modes as explained below with reference to FIG. 3. In one embodiment, grounding clutch 40 may be an electrically-actuated band clutch, a design which helps eliminate high-pressure hydraulics and their associated weight, size, and/or controls, although other grounding clutches may also be used.

Vehicle 10 further includes a first electric machine 24 having an input member 30 and a second electric machine 26, with the first electric machine connected to the second electric machine via an energy storage system (ESS 25), e.g., a battery and any necessary converter and/or inverter modules, and a power bus 27. First electric machine 24 may be configured as a passively-rectified wound field device that is connected to node A via the input member 30, and driven or energized by the output member 14 of engine 12 only when the engine is on or running. The second electric machine 26 may be configured as a multi-phase AC induction machine or other suitable multi-phase device. Second electric machine 26 is a motor/generator unit, i.e., operable for generating power as an electric generator as well as consuming it as an electric motor depending on the operating mode, unlike first electric machine 24, which is only ever operable as an electric generator. The presence of starter motor 18 enables first electric machine 24 to be configured in this single-use manner.

Still referring to FIG. 1, a one-way clutch 28 has an input side 31 and an output side 33. Input side 31 is connected to node C of the planetary gear set 22, and output side 33 is connected to drive wheels 35 through the second electric machine 26, thereby providing a direct mechanical path between the engine 12 and the drive wheels, ultimately delivering output torque ($T_O$) the drive wheels to propel the vehicle 10. One-way clutch 28 may be a passively-actuated freewheeling device, or may be alternately configured as a SOWC and selectively actuated via a park, reverse, neutral, drive, low gear (PRNDL) shift device 44 connected to one-way clutch 28 via a linkage 46. For example, one-way clutch 28, when configured as a SOWC, may be a mechanical diode clutch or other design having relatively low spin losses. Such a design helps to enable the series mode(s), as explained below with reference to FIG. 3.

First electric machine 24 is adapted to generate or produce electricity, and not to operate as a motor. In one embodiment, the first electric machine 24 may be configured as a passively-rectified wound field device, e.g., a synchronous generator adapted for generating an alternating current (AC) voltage in response to torque input from engine 12. The electrical frequency of first electric machine 24 is generally proportional to the speed of engine 12. As will be understood in the art, a synchronous generator can produce power by rotating electromagnetic fields surrounded by coils that generate a three-phase alternating current, and such a device is thus suited for use as the first electric machine 24.

Referring to FIG. 2, in an alternate embodiment the one-way clutch 28 may be connected to the drive wheels 35 and second electric machine 26 via a second planetary gear set 50. Gear set 50 has three nodes, which are labeled D, E, and F for clarity. The output side 33 of one-way clutch 28 is connected to node E, which in turn is connected to the wheels 35 via the power transmission shaft 34. Node D is connected to the second electric machine 26 via an interconnecting member 52. Node F is connected to stationary member 42. The second planetary gear set 50 is thus adapted for reducing the required size of the second electric machine 26.

Referring to FIG. 3, the various possible operating modes for the vehicle 10 of FIGS. 1 and 2 are presented in table form. Modes 1 and 2 provide forward and reverse power split modes, respectively, wherein the engine 12 and first and second electric machines 24, 26 are both on/running. Grounding clutch 40 of FIG. 1 is disengaged (O), and the one-way clutch 28 is engaged (X). While reverse power split, i.e., Mode 2, is available, its use may cause engine torque to subtract from EV torque, thus reducing available EV torque.

Modes 3 and 4 respectively provide a forward and a reverse series mode. As with Modes 1 and 2, in Modes 3 and 4 both of the first and second electric machines 24, 26 are on, as is the engine 12. However, the status of the grounding clutch 40 and one-way clutch 28 is reversed from that of Modes 1 and 2, i.e., the one-way clutch 28 is disengaged, and the grounding clutch 40 is engaged. Torque from engine 12 of FIG. 1 is transmitted via gear set 22 to the first electric machine 24, which energizes the second electric machine via the ESS 25 and power bus 27. At the same time, torque from the engine 12 passes through gear set 22 and one-way clutch 28 to the power transmission shaft 34, thus providing a direct mechanical path is provided from the engine to the drive wheels 35 in the series modes. When the PRNDL device 44 of FIG. 1 is used to select the mode of one-way clutch 28, i.e., when the one-way clutch is a SOWC, the one-way clutch is disengaged (O). Reverse series, i.e., Mode 4, is available, and engine 12 can power the first electric machine 24, i.e., the generator, to supplement battery power to the second electric machine 26, i.e., the MGU. Mode 4 is unavailable when one-way clutch 28 is configured as a simple overrunning device.

Modes 5 and 6 provide two different EV modes, i.e., forward and reverse, respectively. Referring briefly to FIG. 1, in Modes 5 and 6, the engine 12 is off, and therefore so is first electric machine 24. The second electric machine 26 draws electrical power from the ESS 25 over the power bus 27 to deliver output torque ($T_O$) to the road wheels 35. When the PRNDL device 44 of FIG. 1 is used to select the mode of one-way clutch 28, i.e., when the one-way clutch is a SOWC, the one-way clutch is disengaged (O), and is engaged (X) when the one-way clutch is a simple overrunning device. Reverse EV, i.e., Mode 6, is available, and is relatively efficient compared to an embodiment in which a simple overrunning clutch is used for one-way clutch 28. That is, the gear set 22, engine 12, and first electric machine 24, i.e., the generator, are isolated from the second electric machine 26. As a result, these elements may be stationary to reduce losses. When the one-way clutch 28 is configured as a simple overrunning device instead of a SOWC, the gear set 22 and first electric machine 26 may continue to spin, which does not occur in Mode 6 with the SOWC embodiment as noted above.

While the best modes for carrying out the invention have been described in detail, those familiar with the art to which this invention relates will recognize various alternative designs and embodiments for practicing the invention within the scope of the appended claims.

The invention claimed is:

1. An extended-range electric vehicle comprising:
   drive wheels;
   an engine having an output shaft;
   a planetary gear set having first, second, and third nodes, wherein the first node is connected to and driven by the output shaft of the engine when the engine is on;
   a first electric machine connected to the second node, and configured to operate as a generator when the engine is on;

a one-way clutch having an input side connected to the third node;

a second electric machine connected to an output side of the one-way clutch;

a power transmission shaft connecting the drive wheels to the second electric machine;

an auxiliary starter motor adapted for cranking the engine; and a controller having an algorithm adapted for controlling the engine, the first and second electric machines, the one-way clutch, and the starter motor to thereby provide each of a forward electric-only (EV) mode, a reverse EV mode, at least one power-split mode, and at least one series mode, wherein the at least one series mode provides a direct mechanical path between the engine and the drive wheels.

2. The vehicle of claim 1, further comprising a park, reverse, neutral, drive, low gear (PRNDL) shift device, wherein the one-way clutch is a selectable one-way clutch (SOWC) controlled via the PRNDL device such that the SOWC is open in the reverse setting of the PRNDL device, thus enabling a reverse series mode as the at least one series mode.

3. The vehicle of claim 2, wherein the SOWC is controlled via a direct mechanical link from the PRNDL device.

4. The vehicle of claim 2, wherein the SOWC is a mechanical diode clutch having low spin losses.

5. The vehicle of claim 1, further comprising a grounding clutch adapted for selectively connecting the third node to a stationary member of the vehicle.

6. The vehicle of claim 5, wherein the grounding clutch is an electrically-actuated band clutch.

7. The vehicle of claim 1, further comprising a second planetary gear set disposed between the output side of the one-way clutch and the second electric machine, and adapted to reduce the size of the second electric machine.

8. The vehicle of claim 7, wherein the second planetary gear set has a first node connected to the output side of the one-way clutch and to the power transmission shaft, a second node connected to the second electric machine via an interconnecting member, and a third node connected to a stationary member of the vehicle.

9. An extended-range electric vehicle comprising:
a set of drive wheels;
an engine having an output shaft;
a planetary gear set having first, second, and third nodes, wherein the first node is connected to and driven by the engine output shaft only when the engine is on;
a passively-rectified wound field device connected to the second node, and configured to operate only as a generator, and only when the engine is on;
a selectable one-way clutch (SOWC) having an input side that is connected to the third node;
a multi-phase motor/generator unit (MGU) connected to an output side of the SOWC;
a power transmission shaft connecting the MGU to the drive wheels;
an auxiliary starter motor adapted for cranking the engine; and
a controller having an algorithm adapted for controlling the engine, the wound field device, the MGU, the SOWC, and the starter motor as needed to provide each of a forward electric-only (EV) mode, a reverse EV mode, at least one power-split mode, and at least one series mode, wherein the at least one series mode provides a direct mechanical path between the engine and the drive wheels, and wherein the SOWC overruns in at least one of the forward and reverse EV modes.

10. The vehicle of claim 9, further comprising a park, reverse, neutral, drive, low gear (PRNDL) shift device, wherein the one-way clutch is a selectable one-way clutch (SOWC) controlled from the PRNDL device such that the SOWC is open in the reverse setting of the PRNDL device, thus enabling a reverse direction of travel in the at least one series mode.

11. The vehicle of claim 10, wherein the SOWC is controlled via a direct mechanical link from the PRNDL device.

12. The vehicle of claim 10, further comprising a grounding clutch adapted for selectively connecting the third node to a stationary member of the vehicle.

13. The vehicle of claim 12, wherein the grounding clutch is an electrically-actuated band clutch.

14. The vehicle of claim 10, further comprising a second planetary gear set disposed between the output side of the SOWC and the MGU, and that reduces the size of the MGU.

15. The vehicle of claim 14, wherein the second planetary gear set has a first node connected to the output side of the SOWC and to the power transmission shaft, a second node connected to the MGU via an interconnecting member, and a third node connected to a stationary member of the vehicle.

16. A powertrain for an extended-range electric vehicle having a set of drive wheels and a power transmission shaft connected to the drive wheels, the powertrain comprising:
an engine having an output shaft;
a planetary gear set having three nodes, one of which is connected to and driven by the output shaft of the engine only when the engine is on;
a first electric machine directly connected to another one of the three nodes;
a one-way clutch having an input side connected to the remaining one of the three nodes; and
a second electric machine adapted to operate alternatively as a motor and a generator, and connected, either directly or indirectly, to an output side of the one-way clutch and to the power transmission shaft;
wherein the powertrain is controllable to provide a forward electric-only (EV) mode, a reverse EV mode, at least one power-split mode, and at least one series mode, with the at least one series mode providing a direct mechanical path between the engine and the drive wheels, and with the one-way clutch overrunning in the forward EV mode.

17. The powertrain of claim 15, the vehicle including a park, reverse, neutral, drive, low gear (PRNDL) shift device, wherein the one-way clutch is a selectable one-way clutch (SOWC) controlled directly from the PRNDL device such that the SOWC is open in the reverse setting of the PRNDL device, thus enabling a reverse direction of travel.

18. The powertrain of claim 17, wherein the SOWC is controlled via a direct mechanical link from the PRNDL device.

19. The powertrain of claim 17, further comprising a grounding clutch adapted for selectively connecting a node of the planetary gear set to a stationary member of the vehicle.

20. The powertrain of claim 15, further comprising a second planetary gear set disposed between the output side of the one-way clutch and the second electric machine, and adapted for reducing the size of the second electric machine.

* * * * *